(No Model.)
D. F. MORGAN.
AIR VALVE FOR STEAM OR WATER HEATING APPARATUS.
No. 554,286. Patented Feb. 11, 1896.
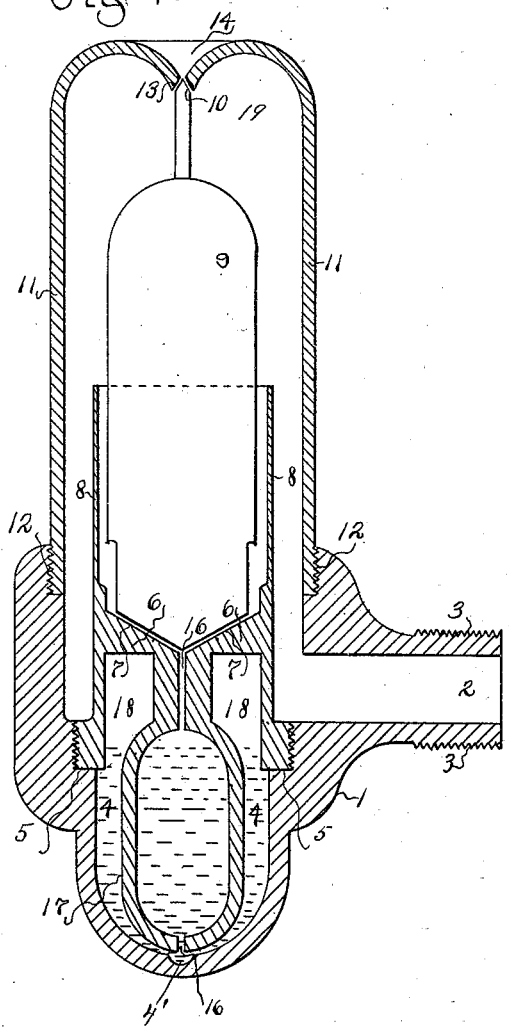
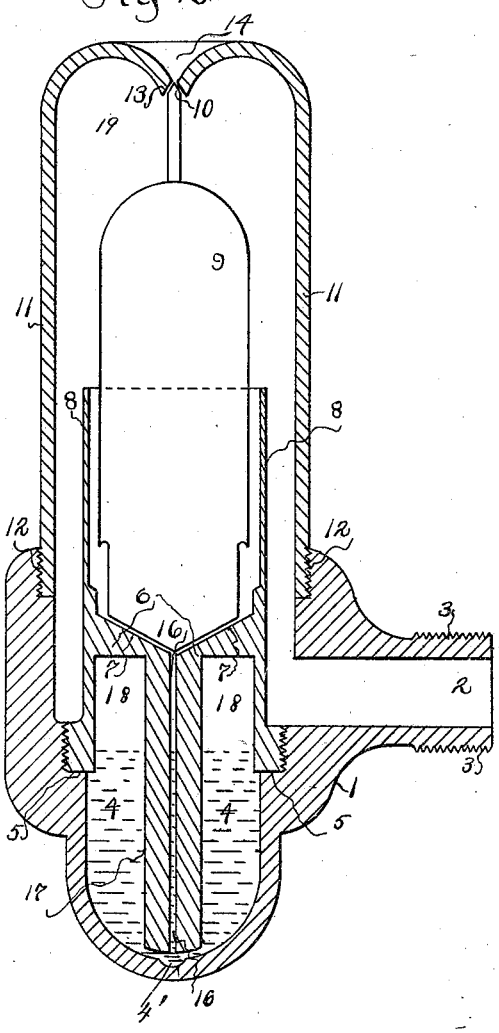
WITNESSES:
INVENTOR
Doctor Franklin Morgan

UNITED STATES PATENT OFFICE.

DOCTOR FRANKLIN MORGAN, OF PHILADELPHIA, PENNSYLVANIA.

AIR-VALVE FOR STEAM OR WATER HEATING APPARATUS.

SPECIFICATION forming part of Letters Patent No. 554,286, dated February 11, 1896.

Application filed May 14, 1894. Serial No. 511,169. (No model.)

*To all whom it may concern:*

Be it known that I, DOCTOR FRANKLIN MORGAN, a citizen of the United States, residing at Philadelphia, in the county of Philadelphia and State of Pennsylvania, have invented certain new and useful Improvements in Air-Valves for Steam or Water Heating Apparatus; and I do hereby declare the following to be a sufficiently full, clear, and exact description thereof as to enable others skilled in the art to make and use the said invention.

This invention relates to air-valves for emptying air from water and steam heating apparatus, and has for its object the more certain opening of such valves when air is present in the apparatus connected therewith and an automatic, prompt and efficient closure of such valves when the air has been expelled and the apparatus has filled with steam or water.

To this end this invention consists of a novel construction of float and guiding-chamber therefor, to which float a valve is connected so as by expansion of fluid as well as by buoyancy of the float to open and close the vent or discharge-orifice, and by the inverted conical form of the base of the float and guiding-chamber give better central guidance to the float and valve and facilitate ingress and egress of fluid between the base of the float and guiding-chamber.

The construction and operation of this invention are hereinafter fully described and shown in the accompanying drawings, in which—

Figure 1 shows a vertical section of one form of this valve, and Fig. 2 a vertical section of a modified form of this valve.

1 represents a body of metal having a horizontal branch 2 screw-threaded at 3, so as to be easily inserted fluid-tight into the radiator or other apparatus with which it is to be used. In the body 1 is formed a well 4, in which a fluid, such as mercury, can be placed. Above this well 4 is formed a shoulder 5 in which a chamber 6 is screwed. The upper part of the chamber 6 is formed with an inverted conical bottom 7 and cylindric sides 8, and in this fits a float 9, having a base of inverted conical form fitting the bottom 7 of the chamber 6, so as to center and support the float 9 when the chamber 6 is emptied of liquid, and attached to the float 6 or integrally with it is a valve 10 upon the upper end of it. A chamber 11 is screwed in a shoulder 12 in the body 1, so as to inclose the float 9 and chamber 6, in which the float 9 is fitted to move easily. A free annular space 19 is inclosed within the casing 11 and around the float 9 and cylindric sides 8 of the chamber 6. The upper part of the chamber 11 contains the valve-seat 13, and around this valve-seat is a conical depression 14 on the exterior of the chamber 11, and the interior form of these parts is parallel with the exterior, presenting returning curves terminating in the thin edge around the valve-seat through which any steam escaping will pass off freely into the air without condensing by contact with the sides of the orifice 13, and avoids the sputtering from condensation incident to the ordinary forms of air-valves, expelling minute drops and streams of water as the valve is closing.

The inner curves of the depression operate to deflect away from the opening 13 any jet of water or spurt of condensation that may be carried up between the inside wall of chamber 11 and outside of the float 9.

A downward tubular extension 17 of the chamber 6 reaches into the mercury-well 4. The upper end of the tube 16 terminates in the center of the conical bottom 7 of the chamber 6, acting as a funnel to facilitate the entrance of mercury to the small tube from the chamber 6, while the lower termination of the tube 16 is abrupt so that the mercury is not apt to escape from the well 4 during transportation and when inverted while screwing the valve into radiators and has a small central aperture or tube 16, reaching nearly to the bottom of the mercury-well 4, in which there is a central depression 4'.

The upper part of the mercury-well 4, in the space marked 18, includes air, and when this air rises in temperature from steam surrounding it, it becomes expanded, presses downwardly on the mercury, and forces the mercury up through the tube 16 under the float 9, and causes the float to rise, and closes the valve 10. Any surplus water which may enter the chamber 6 rises on the surface of the mercury, overflows, and escapes between the float and the chamber containing it, and whenever the valve is cooled, as it is when air is in the radiator or other apparatus therewith connected, the float 9 is down and the valve 10 is open, so that such air is free to pass out through the valve-seat 13 when driven by the pressure of steam entering the radiators. When, however, from the entrance of the steam, the included air also rises in temperature, and the mercury becomes heated and by its expansion rises still further, by reason of the close fitting of the float 9 in the chamber 6; a very small amount in volume of expansion suffices for the lifting of the float 9 and closure of the valve 10. So soon as the temperature again falls, contraction of the air and retraction of the mercury take place, the float descends, reopening the valve. A portion of condensed water follows the surface of the retracted mercury, and keeping it always covered protects it from volatilization or waste.

The parts exposed to the action of the mercury should be of steel or metal not susceptible of amalgamation, or else coated with material such as glass or enamel, varnish or Japan to protect it from amalgamation. As a matter of fact the entire interior of the apparatus may be so protected advantageously and corrosion avoided.

It will be seen that this valve and float are operated conjointly by air expansion and liquid expansion or can be by either alone.

The form of the mercury-chamber and float-chamber is such that they may be transported without losing any appreciable portion of the mercury by being inverted, as they necessarily must be in the act of screwing them into position for use. To this end the tube or channel 16, leading from the reservoir or well to the base of the float-guiding chamber 6, is made very small, so that any flow through it must be necessarily too slow to pass by any quick motion or concussion.

The close fitting of the float in the guiding-chamber, together with the conical form of the bases of these parts, requires but a small amount of mercury to float it, and guides the valve accurately to and from its seat, and furnishes such a considerable range of motion that no adjustment of the valve after it leaves the manufacturer is required or is possible, so that maladjustment by unskillful meddling is avoided.

The walls of the chamber 6 surrounding the float 9 protect it from upward currents inside the chamber 11.

I am aware that valves have been operated by floats governed by volatilizable and condensable fluids in chambers containing non-volatile liquids and exposed to changes of temperature by surrounding fluid current. This I do not claim; but, Having described my invention, what I claim is—

1. In an automatic air-valve for discharging air from radiators, an air-chamber closed at the upper part and containing liquid in the lower part, a float-guiding chamber above said air-chamber, a conduit leading from the base of the air-chamber to the base of the float-guiding chamber, and a float fitted to rise and fall with the variations of liquid-level in the float-guiding chamber, in combination with a chamber inclosing said air-chamber and float-guiding chamber having an inlet-port and an outlet-valve seat and a valve attached to said float to open and close said valve-seat by the expansion and contraction of air in said air-chamber, substantially as set forth.

2. In an air-valve for emptying steam or hot-water heating apparatus of air, a casing having inlet and outlet ports, a valve-seat in said outlet-port, a float, a chamber open at the top and containing liquid supporting said float, a valve attached to said float adapted to open and close said valve-seat, an air-chamber closed at the upper portion inclosed within the said casing and adapted to contain liquid in the lower portion in combination with a conduit leading from the base of said air-chamber to the under side of said float, and arranged to close said valve-seat with said valve by the expansion of air-expelling liquid into the chamber containing the float and thereby causing said float and valve to rise as and for the purpose set forth.

3. In an air-valve for discharging air from steam-heating apparatus, a casing having the upper internal end surface formed in curves returning toward the center and inclosing a free annular space as shown and described, in combination with a central valve-port, and conical valve-seat having an acute edge terminating the internal curved end surface of the case, and a valve arranged to open and close said central port and valve-seat, and when open to permit egress of air through said valve seat and port and to retain liquid by directing it centrifugally from said valve-seat substantially as set forth.

4. In an air-valve for discharging air and preventing egress of steam from heating apparatus, an air-chamber, an inclosing chamber having an inlet, and provided with a central outlet-port in the upper end, a valve-seat therein, a valve fitted to open and close said port, a float connected therewith, having an inverted conical base, with its axis coincident with that of the said valve and valve-seat, in combination with a guiding-chamber, having parallel sides, and a conical bottom closely conforming to the bottom of said float arranged to retain water therein and conduit leading from the bottom of said guiding-chamber to the base of said air-chamber and arranged to conduct a fluid heavier than water to and from the said air-chamber substantially as set forth.

5. In an automatic air-valve the combination of an inclosing chamber provided with an inlet-port and an outlet-port, a valve-seat in the outlet-port, an air-chamber within the inclosing chamber closed at the top and adapted to contain air in its upper part, and a liquid in its lower part, a float-guiding chamber superposed to the air-chamber, a float in the guiding-chamber, a valve attached to the float to coact with the valve-seat, and a tube having a small or capillary bore connecting the bottom of the air-chamber with the bottom of the float-guiding chamber, and adapted to retain the liquid in the air-chamber when the valve is inverted substantially as set forth.

6. In an automatic air-valve the combination of an inclosing casing provided with an inlet-port and an outlet-port, an air-chamber arranged in the inclosing casing closed at its upper part and having a central depression at the base, a vessel having an open top arranged above the air-chamber, a float in the vessel, a valve attached to the float and adapted to coact with the valve-seat, and a contracted or capillary tube forming communication between the vessel containing the float and the bottom of the air-chamber, the tube being provided with an abrupt termination in the base of the air-chamber substantially as set forth.

DOCTOR FRANKLIN MORGAN.

Witnesses:
S. FARRA,
A. A. MORGAN.